United States Patent [19]

Fujimoto

[11] Patent Number: 4,511,916
[45] Date of Patent: Apr. 16, 1985

[54] METHOD AND DEVICE FOR CORRECTING CHROMINANCE SIGNAL

[75] Inventor: Ryo Fujimoto, Kanagawa, Japan

[73] Assignee: Canon Kabushiki Kaisha, Tokyo, Japan

[21] Appl. No.: 478,889

[22] Filed: Mar. 25, 1983

[30] Foreign Application Priority Data

Apr. 7, 1982 [JP] Japan .................. 57-57936

[51] Int. Cl.³ .................................. H04N 9/535
[52] U.S. Cl. ........................................ 358/28
[58] Field of Search ............. 358/28, 40, 27, 22

[56] References Cited

U.S. PATENT DOCUMENTS 4,296,432 10/1981 Engel et al. ................ 358/28

Primary Examiner—John C. Martin
Assistant Examiner—Michael Dunnam
Attorney, Agent, or Firm—Toren, McGeady and Stanger

[57] ABSTRACT

A method and a device for correcting a chrominance signal is arranged such that, in obtaining a carrier chrominance signal by modulating a subcarrier with an input chrominance signal, a first hue component which has a phase about plus 90° relative to the phase of the subcarrier of a specific hue component of the input chrominance signal and a second hue component which has a phase about minus 90° relative thereto are taken out; when the first and second hue components are sufficiently small, the carrier chrominance signal is corrected to correct the color of the specific hue component without affecting other colors.

10 Claims, 4 Drawing Figures

METHOD AND DEVICE FOR CORRECTING CHROMINANCE SIGNAL

BACKGROUND OF THE INVENTION

1. Field of the Invention

This invention relates to a method and a device for correcting a chrominance signal by correcting an input chrominance signal such as a color or color difference signal.

2. Description of the Prior Art

Conventional chrominance signal correcting devices of this kind include, for example, a method of using a matrix color correction circuit. Assuming that the levels of luminance, red and green before correction are expressed by YL, R and G and those levels after correction are YL', R' and G' respectively, the correction is carried out, in accordance with the conventional method, by preparing a resistance matrix IM in such a way as to obtain a relation of: $(YL', R', B')^t = IM(YL, R, B)^t$ This method, however, is not suitable for an attempt to correct solely one specific color because such correction inevitably affects other colors. Most of known methods are also not suited for single color correction because they also affect other colors.

SUMMARY OF THE INVENTION

It is a general object of the invention to provide a method or a device for correction of a chrominance signal which is capable of adjusting the saturation or hue of a desired color without bringing about any adverse effect on other colors.

This and other specific objects and features of the invention will become apparent from the following detailed description of preferred embodiments thereof taken in connection with the accompanying drawings.

DETAILED DESCRIPTION OF THE PREFERRED EMBODIMENTS

Figure 1:
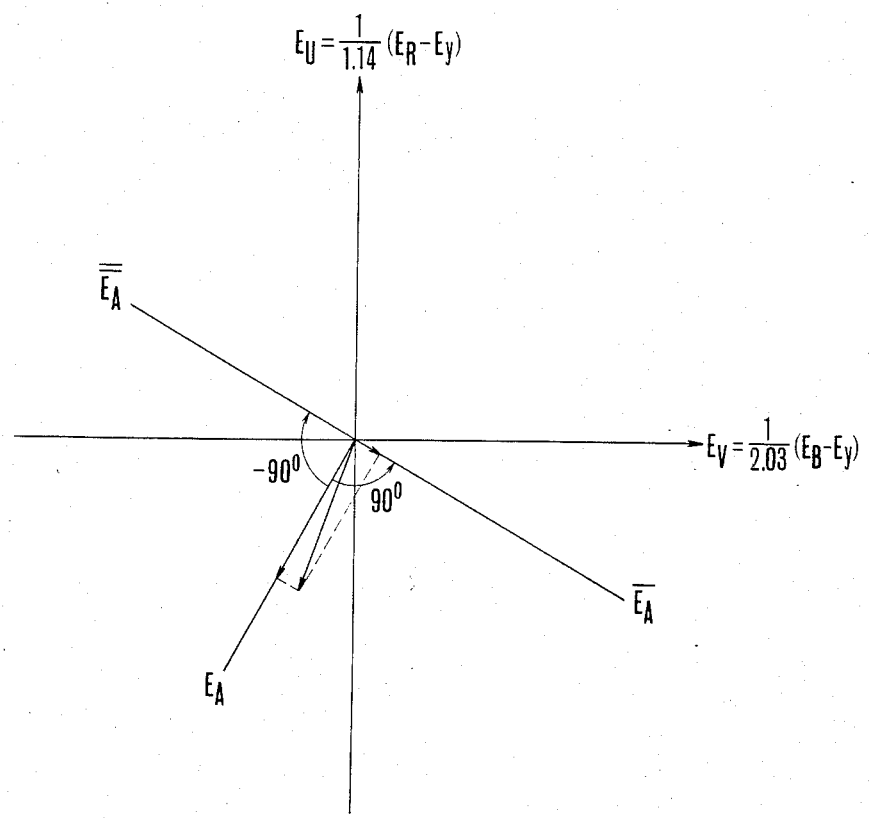
FIG. 1 is an illustration showing a composition vector of a carrier chrominance signal.
Figure 2:
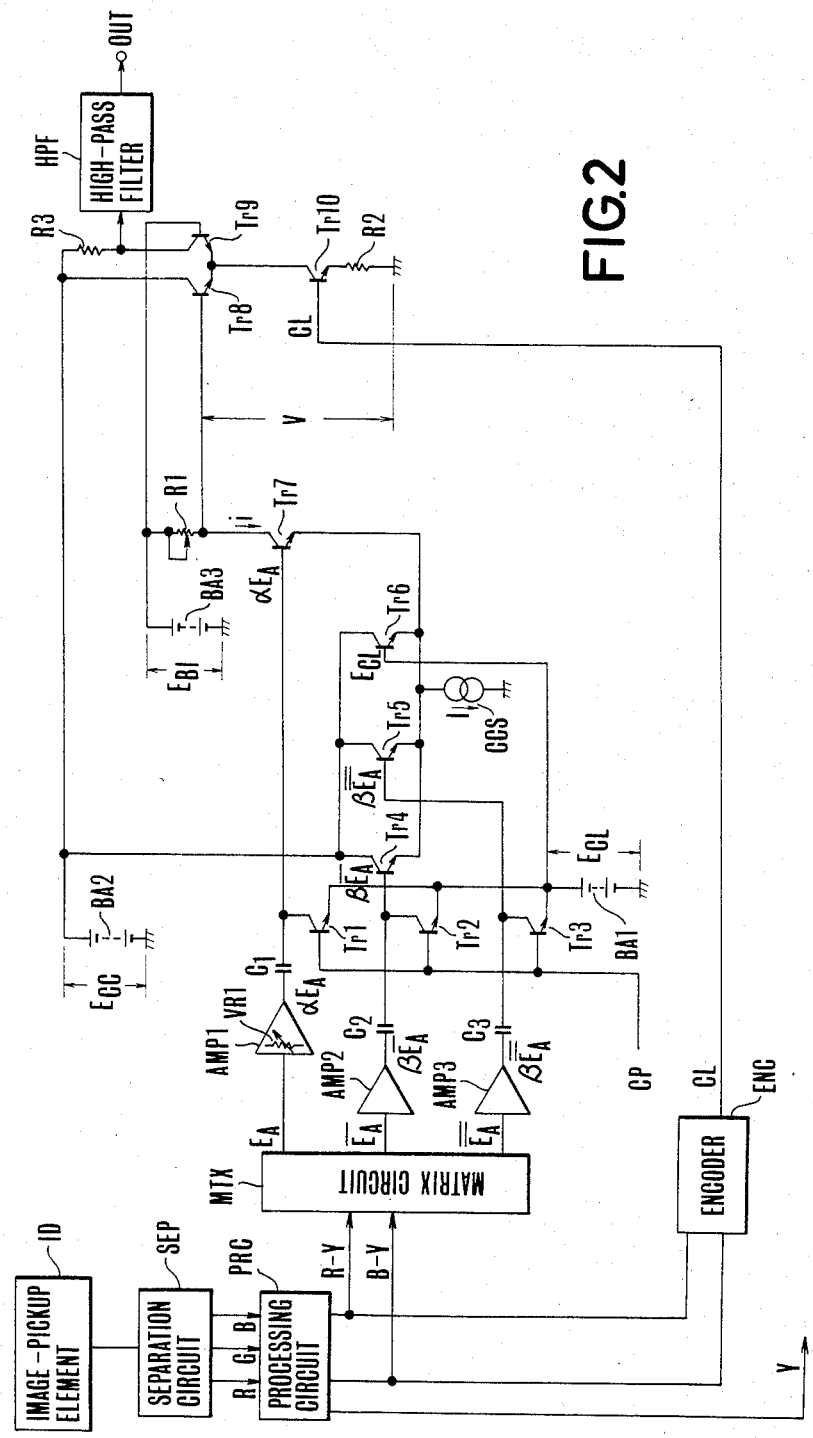
FIG. 2 is a circuit diagram showing the chrominance signal correction circuit as an embodiment of the present invention.

Referring to FIG. 1 which shows a composition vector of a carrier chrominance signal to be ultimately obtained, let us assume that the degree of saturation is to be corrected in accordance with an A direction component $E_A$ only in the case of a color in the direction A. Assuming that a component in a direction the phase of which is advanced +90° from the direction A is $\overline{E_A}$ and a component in another direction of a phase advanced −90° from the direction A is $\overline{\overline{E_A}}$, the color can be considered to be solely composed of a color component in the direction A if both the components $\overline{E_A}$ and $\overline{\overline{E_A}}$ are of sufficiently small values. Accordingly, when it is desired to correct only a color A, the components $\overline{E_A}$ and $\overline{\overline{E_A}}$ are detected and determined whether they are of sufficiently small values. An example of circuit arrangement to carry out this operation is as shown in FIG. 2. The circuit arrangement includes an image pickup element ID which is either a CCD or a BBD or the like; a color separation circuit SEP which is arranged to separate colors from the output of the image pickup element ID to obtain signals R, G and B; a processing circuit PRC which is arranged to obtain a luminance signal Y and color difference signals R−Y and B−Y from the signals R, G and B; an encoder ENC which is arranged to obtain a carrier chrominance signal CL by phase and amplitude modulating (called quadrature two-phase modulation) a subcarrier with the color difference signals; and a matrix circuit MTX. The matrix circuit MTX is arranged to take out a specific hue signal $E_A$ from the color difference signal; a first hue signal $\overline{E_A}$ which is of a phase advanced +90° from the phase of the above-stated specific hue signal $E_A$ relative to the subcarrier for modulation by the encoder ENC; and a second hue signal $\overline{\overline{E_A}}$ which is of a phase advanced −90° from that of the specific hue signal. The circuit arrangement further includes an amplifier AMP1 which amplifies at a rate α; amplifiers AMP2 and AMP3 which are arranged to be of an amplification rate β; transistors Tr1-Tr10; capacitors C1-C3; resistors R1-R3; batteries BA1-BA3, the voltage of the battery BA1 being expressed as $E_{CL}$, that of the battery BA2 as $E_{CC}$ and that of the battery BA3 as $E_{BF}$, a constant current source CCS which is of a current value I; and a high-pass filter HPF.

A signal produced from the image pickup element ID is divided into three chrominance signals R, G and B. These divided chrominance signals are supplied to the processing circuit PRC. The processing circuit PRC then performs a prescribed computing operation on the chrominance signals R, G and B to obtain thereby a luminance signal Y and color difference signals R−Y and B−Y. The encoder ENC balance modulates the chrominance subcarrier with the color difference signals R−Y and B−Y for obtaining the carrier chrominance signal CL. Meanwhile, the color difference signals R−Y and B−Y are also supplied to the matrix circuit MTX. The matrix circuit MTX is arranged to give the above-stated specific hue signal $E_A$, the first hue signal $\overline{E_A}$ and the second hue signal $\overline{\overline{E_A}}$. The specific hue signal $E_A$ is amplified α times by the amplifier AMP1. The first and second hue signals $\overline{E_A}$ and $\overline{\overline{E_A}}$ are respectively amplified β times by the amplifiers AMP2 and AMP3. The 0 level of each of the components is clamped by a clamp pulse CP at the transistors Tr1-Tr3. Each clamped component is supplied to the base of the transistor Tr7, Tr4 or Tr5. Meanwhile, a reference potential $E_{CL}$ is also applied to the base of the transistor Tr6. The emitters of the transistors Tr4, Tr5, Tr6 and Tr7 are connected in common to a constant current source CCS.

With the connection arranged as described above, the collector current i of the transistor 7 becomes as shown below:

(i) At the time of $\alpha E_A > \beta \overline{E_A}$, $\alpha E_A > \beta \overline{\overline{E_A}}$ and $\alpha E_A > E_{CL}$ or when $$E_A > \frac{\beta}{\alpha} \overline{E_A}, E_A > \frac{\beta}{\alpha} \overline{\overline{E_A}}$$

and $\alpha E_A > E_{CL}$: This condition represents a case where $E_A$ is of a positive value and the $\overline{E_A}$ and $\overline{\overline{E_A}}$ are of sufficiently small values. The determination of the sufficiently small value varies with the manner in which the value of β/α is selected. Normally, however, the sufficiently small value is determined between 5 and 10 or thereabout.

Except when the base input voltage of the transistors Tr4–Tr7 is within a range from 0 to several tens of mV, these transistors Tr4–Tr7 serve as switch. Besides, since $\alpha\overline{E_A}$ and $\beta\overline{\overline{E_A}}$ are arranged to become several V at the time of a normal video output, they can be considered to serve as switches.

Therefore, under the condition of Para. (i), the collector current i of the transistor Tr7 becomes: $i=I$ (ii) At the time of $\alpha E_A < E_{CL}$, $\alpha E_A < \beta\overline{E_A}$ or $\alpha E_A < \beta\overline{\overline{E_A}}$: This condition represents a case where the values of $\overline{E_A}$ and $\overline{\overline{E_A}}$ cannot be considered sufficiently small, that is, where the specific color does not exist. Under this condition, the collector current i of the transistor Tr7 is: $i=0$.

(iii) When $\alpha E_A = \beta\overline{E_A} > E_{CL}$ or $\alpha E_A = \beta\overline{\overline{E_A}} > E_{CL}$: $i=I/2$ (iv) When $\alpha E_A = \beta\overline{E_A} = \beta\overline{\overline{E_A}} > E_{CL}$: $i=I/3$ (v) When $\alpha E_A = \beta\overline{E_A} = \beta\overline{\overline{E_A}} = E_{CL}$: This corresponds to a case where there is no color and the collector current i becomes: $i=I/4$.

The potential V of the collector of the transistor Tr7 thus varies according to the case as mentioned above. Accordingly, the carrier chrominance signal CL supplied to the base of the transistor Tr10 is transferred from the transistor Tr9 to the high-pass filter HPF after it has been amplified according to the varied value of each case. As will be understood from the foregoing, the amplification constant varies when $\beta\overline{E_A}=\alpha E_A$ or when $\beta\overline{\overline{E_A}}=\alpha E_A$. This can be expressed as follows:

$$\overline{E_A} = \frac{\alpha}{\beta} E_A \text{ or } \overline{\overline{E_A}} = \frac{\alpha}{\beta} E_A$$

Considering the carrier chrominance signal on a vectorial illustration, proper selection of the values of $\alpha$ and $\beta$ enables to determine on the vectorial illustration the range from which the amplification constant is to be increased. In the case of FIG. 2, the magnification ratio of $\beta$ is fixed while that of $\alpha$ is variable by means of the variable resistor VR1 which is provided within the amplifier AMP1. In this case, therefore, the above-stated range can be adjusted solely by means of the variable resistor VR1 of the amplifier AMP1. Further, the degree of correction for the carrier chrominance signal is adjustable solely by means of the resistor R1.

In accordance with this invention as described in the foregoing, the timing at which only a specific hue component is produced can be detected by comparing the specific hue component with the first and second components the phases of which are differing from that of the specific hue component about 90° in the plus and minus directions respectively about the subcarrier. Therefore, the carrier chrominance signal is controlled by this timing, so that control can be accomplished solely over the specific hue without affecting other colors.

Further, in this embodiment, the hue component outputs $E_A$, $\overline{E_A}$ and $\overline{\overline{E_A}}$ are arranged to be supplied to transistors while these transistors are arranged to have a common emitter. This arrangement permits simplification of the circuit for comparison of the hue component outputs. In accordance with this embodiment, the correcting range, i.e. an extent to which the carrier chrominance signal is to be corrected on the composition vector is adjustable by means of a single variable resistor while the degree of the correction is also adjustable by another variable resistor. All the adjustment required thus can be accomplished by using only two variable resistors. Besides, since the correction circuit separates from the encoder which modulates the subcarrier with the input chrominance signal, other circuits remains unaffected by the process. The embodiment thus permits modification of the body of the apparatus without difficulty. Also, the circuit arrangement of the embodiment is highly suitable for the adoption of integrated circuits.

Figure 3:
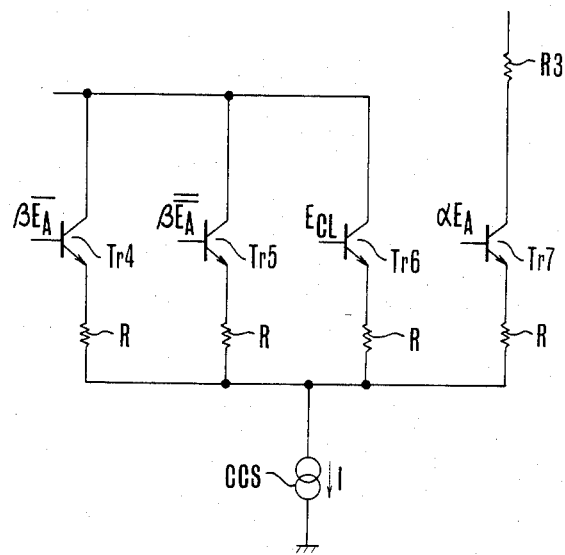
FIGS. 3 and 4 are circuit diagrams showing respectively modifications of the circuit shown in FIG. 2.
Figure 4:
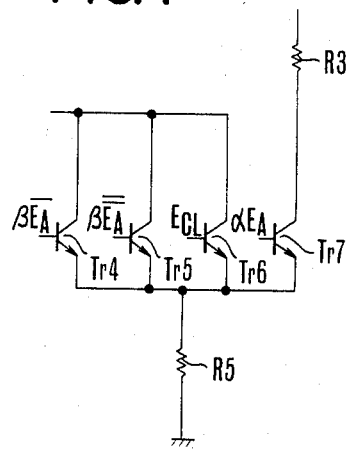

Referring now to FIG. 3, in another embodiment of the invention, the arrangement of the transistors Tr4–Tr7 is partly changed from the embodiment described in the foregoing. In this case, each emitter is not directly connected to the constant current source but is connected thereto through a resistor R. This arrangement eases the switch-like action to permit a continuous change. FIG. 4 shows another embodiment example, in which the constant current source is replaced with a resistor R5. In this embodiment, the collector current i does not become $i=I$ under the condition of (i) shown above and becomes a value proportional to $\alpha E_A$. Therefore, the amplification degree of the carrier chrominance signal varies in proportion to $E_A$. Further, it is also possible to insert resistors after the emitters and to connect the four emitters in the same manner as in the case of FIG. 3 and then to connect them to a resistor instead of a constant current source as in the case of FIG. 4.

In the embodiment shown in FIG. 2, the amplification part for the carrier chrominance signal is arranged to be of a mere differential type by means of the transistors Tr8 and Tr9. However, the present invention is not limited to such arrangement. The differential type may be replaced with other types such as a type using, for example, a balanced modulator, or a voltage variable amplifier utilizing the characteristic of a transistor or FET. In the specific embodiments described in the foregoing, the chrominance signal correction is performed on the output of the image pickup element. However, the chrominance signal correction according to the invention is of course applicable also to an antenna input propagated through the air or to a cable input.

While preferred embodiments have been described, variations thereto will occur to those skilled in the art within the scope of the present inventive concepts which are delineated by the following claims.

What I claim:

1. A method for correcting a chrominance signal, comprising steps of:
    (a) obtaining a carrier chrominance signal by modulating a carrier with an input chrominance signal;
    (b) taking out from said input signal a first hue component which is of a phase differing about plus 90° from the phase of a specific color relative to the carrier and a second hue component which is of a phase differing about minus 90° from the phase of the specific color;
    (c) determining the magnitudes of said first and second hue components; and
    (d) correcting said carrier chrominance signal when the magnitudes of said first and second hue components are determined to be less than a prescribed value.

2. A method according to claim 1, wherein said carrier chrominance signal is corrected when the ratio of said first and second hue components to the phase component of said specific color is less than a prescribed ratio.

3. A method according to claim 1, wherein the level of said carrier chrominance signal is corrected in said correcting step.

4. A method according to claim 2, wherein said prescribed ratio is variable.

5. A method according to claim 2, wherein said carrier chrominance signal is corrected when the magnitude of the phase component of said specific color is at least 5 times as much as those of said first and second hue components.

6. A method according to claim 3, wherein the correcting degree of said level is variable or alterable.

7. A device for correcting a chrominance signal, comprising:
- (a) a modulation circuit which is arranged to modulate a carrier with an input chrominance signal to give a carrier chrominance signal thereby;
- (b) a detection circuit which takes out from said input chrominance signal a phase component of a specific color, a first hue component of phase differing about plus 90° from the phase component of said specific color and a second hue component which is of a phase differing about minus 90° from the phase of said specific color about the said carrier;
- (c) a comparison circuit which compares and determines the ratio of said first and second hue components to said phase component of said specific color; and
- (d) a correction circuit which corrects said carrier chrominance signal by means of the output of said comparison circuit.

8. A device according to claim 7, further including an amplifier circuit which supplies said phase component of the specific color to said comparison circuit by amplifying the phase component at an amplification constant differing from amplification constants for said first and second hue components.

9. A device according to claim 8, wherein the amplification constant of said amplifier circuit for said first and second hue components is variable or alterable relative to the amplification constant thereof for the phase component of said specific color.

10. A device according to claim 7, wherein said comparison circuit comprises transistors which are arranged to have the outputs of said phase component of said specific color, said first and second hue components supplied to the bases thereof and to have a common emitter.

* * * * *